United States Patent
Rademacher et al.

[11] Patent Number: 6,124,696
[45] Date of Patent: Sep. 26, 2000

[54] PROGRAMMABLE STEPPER MOTOR CONTROLLER AND METHOD THEREFOR

[75] Inventors: Timothy John Rademacher, Lexington; Randall David Mayo, Georgetown, both of Ky.

[73] Assignee: Lexmark International, Inc., Lexington, Ky.

[21] Appl. No.: 09/352,972

[22] Filed: Jul. 14, 1999

[51] Int. Cl.[7] .................................................. H02P 8/00
[52] U.S. Cl. .......................... 318/696; 318/685; 318/561; 318/601; 364/470; 371/42
[58] Field of Search ................................. 318/646, 685, 318/561, 601; 371/42; 364/470

[56] References Cited

U.S. PATENT DOCUMENTS

| | | |
|---|---|---|
| 4,137,491 | 1/1979 | Bartley et al. . |
| 4,568,866 | 2/1986 | Floro et al. ............................ 318/696 |
| 4,646,026 | 2/1987 | Chemali et al. . |
| 4,714,867 | 12/1987 | Palmin et al. . |
| 4,871,272 | 10/1989 | Stein et al. . |
| 5,032,780 | 7/1991 | Hopkins . |
| 5,084,891 | 1/1992 | Ariyavisitakul et al. ................. 371/42 |
| 5,140,686 | 8/1992 | Cox et al. ............................... 364/470 |
| 5,574,351 | 11/1996 | Jacobson et al. . |
| 5,640,075 | 6/1997 | Brasseur et al. . |

*Primary Examiner*—Karen Masih
*Attorney, Agent, or Firm*—D. Andrew Floam, Esq.; D. Brent Lambert, Esq.

[57] ABSTRACT

A system and method for controlling a stepper motor wherein the amount of memory space needed to store a phase table is minimized. The stepper motor controller comprises a memory sized to store data representing a plurality of states for current outputs to be supplied to a first winding of a stepper motor and from which are derived current outputs for the first winding and a second winding of the stepper motor. A finite state machine is coupled to the memory. The finite state machine comprises a first address register that stores an address for data in the memory for a present state of the first winding and a second register that stores an address for data in the memory for a present state of the second winding. When the finite state machine receives as input a step control or command signal, it reads a bit pattern from the memory at an address corresponding to the contents of the first address register and derives from the retrieved bit pattern current control output for the first winding, and reads a bit pattern from the memory at an address corresponding to the contents of the second register which is equal to the contents of the first address register plus an offset value and derives from the retrieved bit pattern current control output for the second winding.

19 Claims, 3 Drawing Sheets

FIG 2

| Bit | Description |
|---|---|
| B₃ | Phase bit for reverse direction |
| B₂ | Phase bit for forward direction |
| B₁ | Current control bit 0 |
| B₀ | Current control bit 1 |

FIG 3

| | | FULL CURRENT STATES | | | | | | | | DETENT STATES | | | | | | | |
|---|---|---|---|---|---|---|---|---|---|---|---|---|---|---|---|---|---|
| ADDRESS | 0 | 1 | 2 | 3 | 4 | 5 | 6 | 7 | 8 | 9 | 10 | 11 | 12 | 13 | 14 | 15 |
| State # | 0 | 1 | 2 | 3 | 4 | 5 | 6 | 7 | 0 | 1 | 2 | 3 | 4 | 5 | 6 | 7 |
| Bit | | | | | | | | | | | | | | | | | |
| PHADN B₃ | 1 | 1 | 0 | 0 | 0 | 0 | 0 | 0 | 0 | 0 | 1 | 1 | 1 | 0 | 0 | 0 |
| PHAUP B₂ | 1 | 1 | 1 | 1 | 0 | 0 | 0 | 0 | 1 | 1 | 1 | 0 | 0 | 0 | 0 | 0 |
| AI0 B₁ | 1 | 0 | 1 | 0 | 1 | 0 | 1 | 0 | 0 | 1 | 1 | 1 | 1 | 1 | 0 | 0 |
| AI1 B₀ | 0 | 1 | 1 | 1 | 0 | 1 | 1 | 1 | 1 | 1 | 1 | 1 | 1 | 1 | 1 | 1 |

PROGRAMMABLE STEPPER MOTOR CONTROLLER AND METHOD THEREFOR

BACKGROUND OF THE INVENTION

1. Field of the Invention

This invention relates generally to stepper motors, and more particularly to a stepper motor controller implemented in a minimal amount of silicon space.

2. Related Art

Printers, such as inkjet printers, use a stepper motor to feed paper. A controller for the stepper motor resides in the printer, such as in the form of an application specific integrated circuit (ASIC). A table of information used by the controller to control the movements of the stepper motor is "hard-coded" in the ASIC. The phase table contains an entry for each operating state of the stepper motor and corresponding output signals (phase signals which determine current direction and current level signals) for a stepper motor driver circuit. For certain motor drivers, the phase signals in some states change depend on the direction that the motor is running.

The phase table values change from printer to printer to accommodate different printer characteristics. Examples of characteristics that differ among printers are driver circuits, motor torque, acoustics and power consumption. It is desirable to have a phase table that is programmable by the printer software so that the values of the phase table can be determined later in the product development cycle. A software-programmable phase table also allows for the use of different phase tables for different operations or modes in the printer, thereby optimizing the stepper motor characteristics for a particular move.

SUMMARY OF THE INVENTION

Briefly, the present invention is directed to a system and method for controlling a stepper motor wherein the amount of memory space needed to store a phase table is minimized. The stepper motor controller comprises a memory sized to store data representing a plurality of states for current outputs to be supplied to a first winding of a stepper motor and from which are derived current outputs for the first winding and a second winding of the stepper motor. A finite state machine is coupled to the memory. The finite state machine comprises a first register that stores an address for data in the memory for a present state of the first winding and a second register that stores an address for data in the memory for a present state of the second winding. When the finite state machine receives as input a step control or command signal, it reads a bit pattern from the memory at an address corresponding to the contents of the first register and derives from the retrieved bit pattern current control output (phase and current level signals) for the first winding, and reads a bit pattern from the memory at an address corresponding to the contents of the second register which is the content of the first address plus an offset value and derives from the retrieved bit pattern current control outputs for the second winding. The current control outputs for the windings of the stepper motor comprise a current level component and a current direction component.

The above and other objects and advantages of the present invention will become more readily apparent when reference is made to the following description, taken in conjunction with the accompanying drawings.

BRIEF DESCRIPTION OF THE DRAWINGS

FIG. 2 is a legend indicating an example of a 4-bit representation for phase table values.

FIG. 3 is a memory diagram containing examples of the data in a phase table.

DETAILED DESCRIPTION OF THE INVENTION

Figure 1:
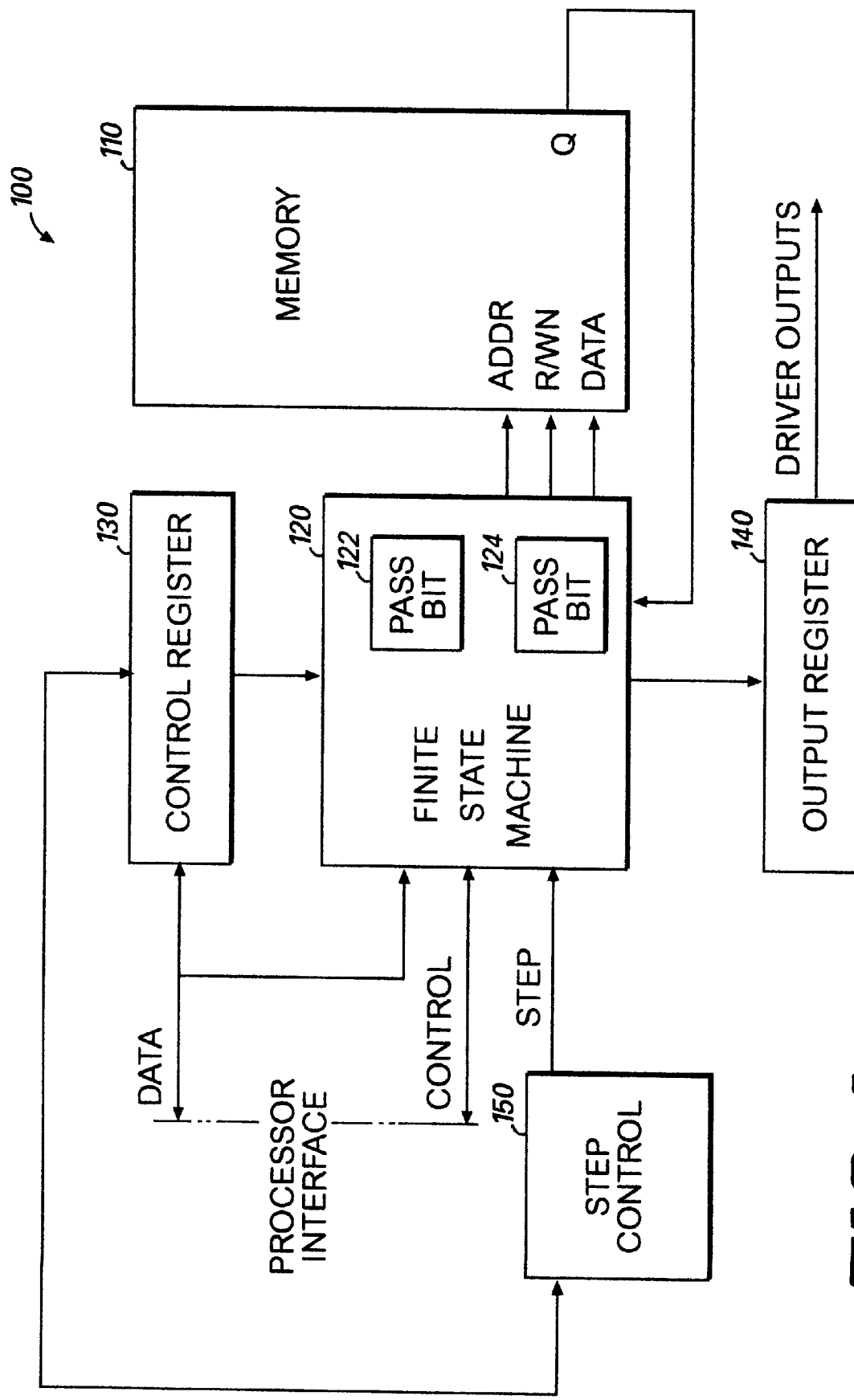
FIG. 1 is a block diagram of a stepper motor controller according to the present invention.

Referring first to FIG. 1, a block diagram of a stepper motor controller is shown. The stepper motor controller is shown generally at reference numeral 100. The stepper motor controller 100 features a rewritable memory 110 used to hold a programmable phase table. The rewrittable memory 110 is, for example, a static random access memory (SRAM), that is sized to reduce the amount of silicon space needed to implement it, as is explained hereinafter.

The stepper motor controller 100 further comprises a finite state machine 120, a control register 130, an output register 140 and a step control circuit (block) 150. Interface between the stepper motor controller 100 and a host processor is by way of a control input to the finite state machine 120 and data input and output through the control register 130.

The size of the rewrittable memory 110 is reduced by a factor of four by taking advantage of the symmetry in the output waveforms for a stepper motor. First, the size of the rewrittable memory is reduced by one-half by using one set of bits to represent both sets of output waveforms. Next, the size of the rewrittable memory is reduced further by one-half by using the stored bits for the states twice. On the first pass through the states, the phase outputs are taken directly from the bits stored in the table. On the second pass through the states, the phase outputs are the inverse of the values stored in the table. The phase signal is stored using two bits: one bit for the forward direction and another bit for the reverse direction.

The finite state machine 120 includes first and second pass bits 122 and 124, respectively. The first pass bit 122 is for tracking phase changes associated with a first winding of the stepper motor and the second pass bit 124 is for tracking phase changes associated with a second winding of the stepper motor. If additional windings were to be driven on a stepper motor, then additional pass bits would be provided therefor.

The control register 130 interfaces with a host processor to pass data comprising a series of bits which determine the action at the next timer expiration. This data includes detent, step size, whether or not to step at the time expiration, which of two or more phase tables to use, whether or not to actually send the outputs to the stepper drive, and if an interrupt is to be initiated upon timer expiration. This data is used by the step control block 150 so that it knows when and how far to step and when to go to a detent state. The information sent back to the host processor from the control register includes the present state of the motor, the present location in the phase table, and the number of repeat loops left if the motor movement has a predetermined number of times to be repeated for a constant speed part of a motor movement.

The step control block 150 controls the timing for the steps initiated by the stepper motor controller 100. The step control block 150 reads in sequence a series of time values associated with a timer included therein and control values stored in the control register 130. The step control block 150 takes the control values and generates as output a step command to the finite state machine upon the expiration of the timer.

The legend table shown in FIG. 2 shows one entry for a phase table shown in FIG. 3. The phase table shown in FIG. 3 is an example of a 16×4 memory 110 for 16 states, each state having a full-current mode and a detent mode. The 4 bits in this example are defined as $B_3B_2B_1B_0$. The finite state machine 120 controls the change in current outputs. When moving the stepper motor in the forward direction, the finite state machine 120 uses bit $B_2$ for the phase bit, and when running in the reverse direction, the finite state machine 120 uses bit $B_3$ for the phase bit. In accordance with this example, the stepper motor has two sets of windings that are to be driven by a stepper motor controller 100. The current control outputs generated for the windings of the stepper motor comprises a current level component and a current direction component derived from the phase table. The current control outputs for the first winding are taken directly from the phase table. The phase output for the first winding is the phase bit from the table for the present motor direction, exclusive-OR'ed (XOR'ed) with the pass bit 122 for the first winding. The pass bit 122 is toggled when the address to the phase table wraps around either end such that the phase output will be inverted on each pass through the phase table.

As for the current control outputs for the second winding, the control register 130 stores an offset value for the current output of the second winding. Alternatively, a fixed offset could be used, such as "4." The outputs for the second winding are determined according to a similar method as for outputs for the first winding, but using the present address for the phase table plus the offset value. This is possible due to the symmetry of the control signals for the two windings. The control signals are identical, but shifted in phase by 90 degrees.

The finite state machine 120 has several "on-board" registers to store address values and other values generated in the course of stepping through a phase table. For example, there is a register called Aaddr that stores a value for the address of the memory 110 corresponding to the present state for the first winding. There is also a register called Baddr that stores the address for the second winding.

Figure 4:
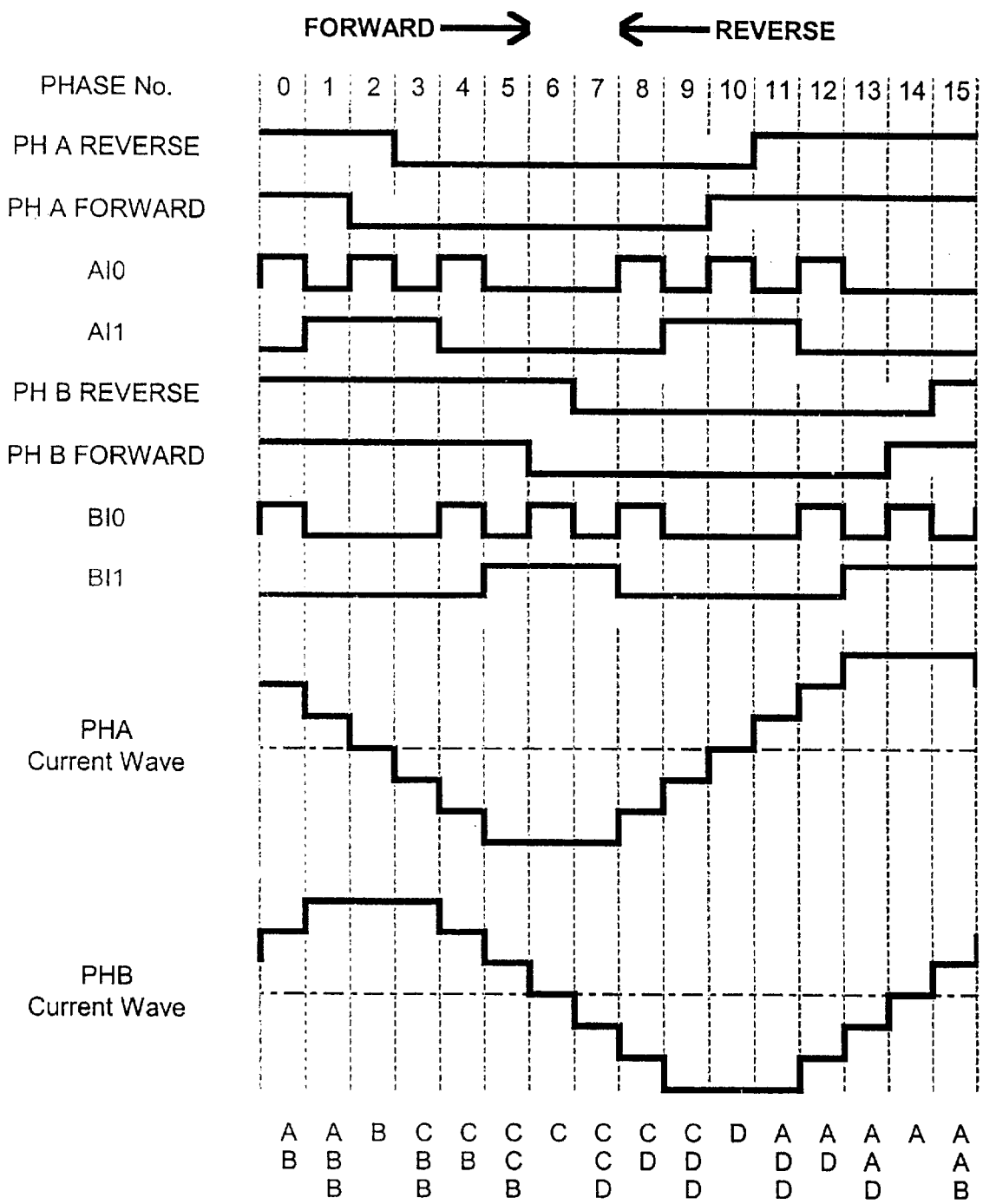
FIG. 4 is a phase diagram for a stepper motor.

With reference to FIGS. 3 and 4 in conjunction with FIG. 2, the operation of the stepper motor controller 100 is as follows. A step occurs when the finite state machine 120 receives a step command signal from the step control block 150. The finite state machine 120, in response thereto, reads the memory 110 at the address Aaddr and XOR's the value of the appropriate phase bit from the memory 110 (bit $B_2$ or $B_3$ depending on the direction of the stepper motor) with the value of the first pass bit. The result of this logic operation is stored in one bit of a temporary 3-bit register, and the other two bits correspond to the values of the two current level bits $B_0$ and $B_1$, respectively, from the memory 110.

For example, assuming that the present contents of the Aaddr register is 0010 (corresponding to address location 2 in the phase table), then the value of the phase bit $B_2$ (assuming a forward or up direction) is "0" and the values of the current level bits $B_0$ and $B_1$ are "11" as determined from the phase table shown in FIG. 3. The value of the phase bit $B_2$ is XOR'ed with the value of the first pass bit 122, which in this example is assumed to be "0. " Therefore, the result of the XOR operation is "0" and consequently the contents of the 3-bit temporary register is "011" where the most significant bit position corresponds to the result of the XOR operation (though this is arbitrary so long as a convention is established and maintained).

The address for the second winding is computed according to the equation Baddr=Aaddr+offset, where the carry is ignored. The finite state machine 120 reads the memory 110 at a location corresponding to the value of Baddr (computed as above) to obtain the value of the two current level bits $B_0$ and $B_1$ at that location. In addition, the finite state machine 120 XOR's the appropriate phase bit from the memory at that location with the value of the second pass bit 124. The contents of the 3-bit temporary register (computed as above) and the 3 bits for the second winding are written to the output register 140.

Following the example above, then the value of Baddr is 0010+0100 (for decimal 4). The offset value is independent of the movement of the stepper motor. The finite state machine 120 then reads the contents of the phase table shown in FIG. 4 from the memory 110 at location 0110 (address location 6) to obtain the bits 0000. The phase bit (assuming the forward direction) is bit $B_2$ whose value is "0" and this bit is XOR'ed with the pass bit 124 (which is assumed to be "0") with a result of "0. " The three bits therefore are "000" where the value of bits $B_1$ and $B_0$ are the two least significant bits. These three bits together with the contents of the 3-bit temporary register are written to output register 140.

The finite state machine 120 then adds the step size (determined by the control register 120) to the present value of Aaddr, where the step size is either 1 for quarter steps, 2 for half steps or 4 for full steps. Eventually, the value for Aaddr wraps around at a value greater than 7, in the example of a 3-bit phase table. If the motor is running in the reverse direction, then the step size is subtracted rather than added, and the value of Aaddr wraps around the table for values of less than zero.

The process of stepping through the phase table continues according to the procedures explained above. One with ordinary skill in the art will appreciate that the 8×4 array of full-current bits will generate waveforms shown in FIG. 4.

The output register 140 is coupled to the stepper motor driver (not shown) to supply those circuits with the 6 bits computed as explained above in order to drive the stepper motor accordingly.

The detent states are stored in addresses 8 through 15. A detent state is entered when the step control block 150 indicates it as such by setting the most significant bit ($B_3$ as an example) of the address Aaddr for memory 110 based on an input bit in control register 130. The detent states are used to hold the motor in position in between motor moves. These low current states have considerably more torque than the motor's inherent magnetic detents and as such insure that the motor stays in the correct location after a move. At the start of a move, the motor is moved from its detent state to the corresponding full current state for a period of 14 milliseconds, for example. At this point the motor has stopped moving and the first step of the move is taken. After a wait of 8.3 milliseconds, another quarter step is taken. After 2.1 milliseconds another quarter step is taken. After 8.3 milliseconds another quarter step is taken. After 14 milliseconds the motor is set back to detent current. This completes a four quarter step move.

The principles explained above can be applied to build a stepper motor controller that could have any number of current-level bits, where the width of the memory 110 corresponds to the number of current-level bits plus two bits for the phase directions. For example, a stepper motor controller could have three inputs to select eight different current levels. In that case, the memory 110 would be 32×5 with 8 eighth steps per full step.

A still further reduction in the size of the memory 110 can be achieved by storing only a single detent state in a register.

This would reduce the size of the memory 110 to 8×4 (in the 16×4 example described herein). This would, however, require an additional register for the detent state. The appropriate value would need to be written to the detent register before the finite state machine can switch to the detent state.

In summary, the present invention is directed to a stepper motor controller comprising: a memory that stores data representing a plurality of states for current outputs to be supplied to a first winding of a stepper motor; and a state machine coupled to the memory, the state machine comprising a first register that stores an address for data in the memory for a present state of the first winding and a second register that stores an address for data in the memory for a present state of a second winding of the stepper motor, wherein the state machine reads a bit pattern from the memory at an address corresponding to the contents of the first register and derives from the retrieved bit pattern a current control output for the first winding, and reads a bit pattern from the memory at an address corresponding to the contents of the second register which is equal to the contents of the first address register plus an offset value and derives from the retrieved bit pattern a current control output for the second winding.

Similarly, the present invention is directed to a method for controlling a stepper motor comprising steps of: storing in a memory data representing a plurality of states for current outputs to be supplied to a first winding of a stepper motor and from which are derived current outputs for the first winding and a second winding of the stepper motor; in response to a step command signal: reading a bit pattern from the memory at a first address; generating current control output for the first winding from the bit pattern at the first address; reading a bit pattern from the memory at a second address which is equal to the first address plus an offset value; and generating current control output for the second winding from the bit pattern at the second address.

The above description is intended by way of example only, and is not intended to limit the present invention in any way, except as set forth in the following claims.

What is claimed is:

1. A stepper motor controller comprising:
    a memory for storing data representing a plurality of states for current outputs to be supplied to a first winding of a stepper motor and from which are derived current outputs for the first winding and a second winding of the stepper motor; and
    a finite state machine coupled to the memory, the finite state machine comprising a first register that stores an address for data in the memory for a present state of the first winding and a second register that stores an address for data in the memory for a present state of the second winding, wherein the finite state machine receives as input a step command signal and in response thereto reads a bit pattern from the memory at an address corresponding to the contents of the first register and derives from the retrieved bit pattern a current control output for the first winding, and reads a bit pattern from the memory at an address corresponding to the contents of the second register which is equal to the contents of the first register plus an offset value and derives from the retrieved bit pattern a current control output for the second winding.

2. The stepper motor controller of claim 1, wherein the memory stores a bit pattern for each of a plurality of states, wherein the bit pattern for each state comprises a forward direction phase bit, a reverse direction phase bit, and two or more current level bits for the first winding.

3. The stepper motor controller of claim 2, wherein the finite state machine comprises a first pass bit for the first winding and a second pass bit for the second winding, and wherein the finite state machine performs an exclusive-OR operation between the first pass bit and a phase bit from the retrieved bit pattern at the address in the memory for the contents of the first register and corresponding to the direction of the step motor in order to generate the current control output for the first winding, and performs an exclusive-OR operation between the second pass bit and a phase bit from the retrieved bit pattern at the address in the memory for the contents of the second register and corresponding to the direction of the step motor in order to generate the current control output for the first winding.

4. The stepper motor controller of claim 3, wherein the finite state machine toggles the first pass bit when the contents of the first register goes beyond the highest address or the lowest address of the memory and toggles the second pass bit when the contents in the second register goes beyond the highest address or the lowest address of the memory.

5. The stepper motor controller of claim 3, and further comprising an output register, wherein the finite state machine writes to the output register the current level bits retrieved from the memory at a location corresponding to the contents of the first register and a bit representing the results of the exclusive-OR operation with the first pass bit, and the current level bits retrieved from the memory at a location corresponding to the contents of the second register and a bit representing the results of the exclusive-OR operation with the second pass bit.

6. The stepper motor controller of claim 1, and further comprising a step control circuit that generates a step command signal based on a series of time values.

7. The stepper motor controller of claim 6, wherein the memory stores bit patterns for a plurality of phase tables for at least one winding of a stepper motor, wherein the step command signal includes a phase table identifier to identify which bit pattern to be used.

8. The stepper motor controller of claim 1, wherein the memory is a rewritable memory.

9. A method for controlling a stepper motor comprising steps of:
    storing in a memory data representing a plurality of states for current outputs to be supplied to a first winding of a stepper motor and from which are derived current outputs for the first winding and a second winding of the stepper motor;
    in response to a step command signal:
        reading a bit pattern from the memory at a first address;
        generating current control output for the first winding from the bit pattern at the first address;
        reading a bit pattern from the memory at a second address which is equal to the first address plus an offset value; and
        generating current control output for the second winding from the bit pattern at the second address.

10. The method of claim 9, wherein the bit pattern for each state comprises a forward direction phase bit, a reverse direction phase bit, and two or more current level bits for the first winding.

11. The method of claim 10, wherein the step of generating current control outputs for the first winding comprises performing an exclusive-OR operation between a first pass bit and a phase bit from the retrieved bit pattern at the first address in the memory corresponding to the direction of the stepper motor, and the step of generating current control outputs for the second winding comprises performing an exclusive-OR operation between a second pass bit and a phase bit from the retrieved bit pattern at the second address in the memory corresponding to the direction of the stepper motor.

12. The method of claim 11, and further comprising the steps of toggling the first pass bit when the first address goes beyond a highest address or a lowest address of the memory, and toggling the second pass bit when the second address register goes beyond the highest address or the lowest address of the memory.

13. The method of claim 11, wherein the step of generating current control outputs for the first winding comprises supplying as output the current level bits retrieved from the memory at the first address together with the result of the exclusive-OR operation with the first pass bit, and wherein the step of generating current control outputs for the second winding comprises supplying as output the current level bits retrieved from the memory at the second address together with the result of the exclusive-OR operation with the second pass bit.

14. A stepper motor controller comprising:
 a memory that stores data representing a plurality of states for current outputs to be supplied to a first winding of a stepper motor; and
 a state machine coupled to the memory, the state machine comprising a first register that stores an address for data in the memory for a present state of the first winding and a second register that stores an address for data in the memory for a present state of a second winding of the stepper motor, wherein the state machine reads a bit pattern from the memory at an address corresponding to the contents of the first register and derives from the retrieved bit pattern a current control output for the first winding, and reads a bit pattern from the memory at an address corresponding to the contents of the second register which is equal to the contents of the first address register plus an offset value and derives from the retrieved bit pattern a current control output for the second winding.

15. The stepper motor controller of claim 14, wherein the state machine generates as output current control outputs for the first and second windings of the stepper motor, wherein the current control outputs comprises a current level component and a current direction component.

16. The stepper motor controller of claim 14, wherein the memory stores a bit pattern for each of a plurality of states, wherein the bit pattern for each state comprises a forward direction phase bit, a reverse direction phase bit, and two or more current level bits for the first winding.

17. The stepper motor controller of claim 14, and further comprising a step control circuit that generates a step command signal based on a series of time values, wherein the state machine is responsive to the step command signal to read a bit pattern from the memory at an address corresponding to the contents of the first register.

18. The stepper motor controller of claim 17, wherein the memory stores bit patterns for a plurality of phase tables for at least one winding of a stepper motor, wherein the step command signal includes a phase table identifier to identify which bit pattern to be used.

19. The stepper motor controller of claim 14, wherein the memory is a rewritable memory.

* * * * *